Dec. 9, 1941.　　　A. DE GHETTO　　　2,265,897
TIRE BALANCING MACHINE
Filed July 7, 1938　　　2 Sheets-Sheet 1
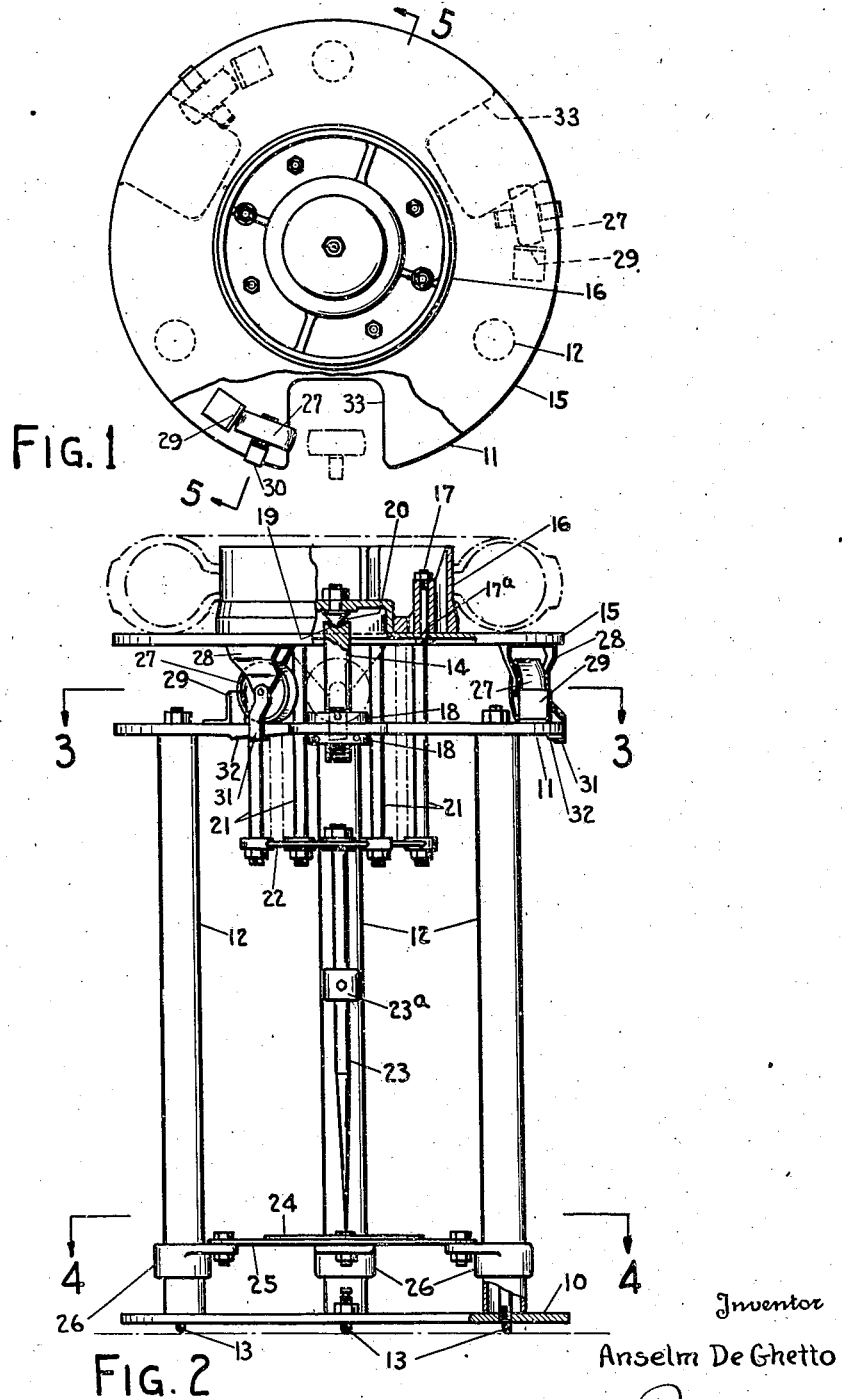
Inventor
Anselm De Ghetto
By Ralph Barrow,
Attorney Dec. 9, 1941.  A. DE GHETTO  2,265,897
TIRE BALANCING MACHINE
Filed July 7, 1938  2 Sheets-Sheet 2

Inventor
Anselm De Ghetto
By Ralph Barrow,
Attorney

Patented Dec. 9, 1941

2,265,897

UNITED STATES PATENT OFFICE 2,265,897

TIRE BALANCING MACHINE

Anselm De Ghetto, Clifton, N. J., assignor to National Rubber Machinery Company, Akron, Ohio, a corporation of Ohio Application July 7, 1938, Serial No. 217,915

6 Claims. (Cl. 73—53)

This invention relates to apparatus for determining if tire casings or like articles are evenly balanced.

An object of the invention is to provide a simple, efficient, inexpensive tire balancing machine by which both the direction and the amount of off balance may readily be determined.

Another object of the invention is to provide a tire balancing machine of the type having a center balancing point with means for preventing damage to the center point in handling the machine to place or remove a tire.

These and other objects will be manifest from the following brief description and the accompanying drawings.

Of the accompanying drawings:

Figure 1 is a top plan view, partly broken away, of apparatus embodying the invention.

Figure 2 is an elevational view thereof.

Figure 3:
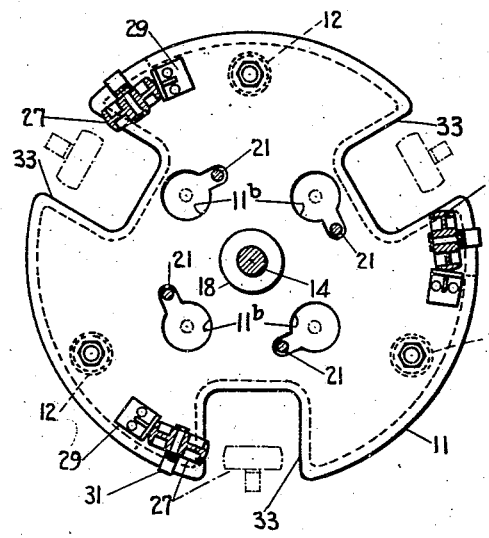
Figure 3 is a cross-section taken on line 3—3 of Figure 2.

Referring to the drawings, a base plate 10 may support a loading plate 11 upon a plurality of rods 12, 12, the base plate 10 preferably being supported on three adjustable leveling screws 13, 13. Suitably spaced above loading plate 11, adjustably supported on a center shaft or socket 14 mounted on plate 11, is a balancing plate 15 having a tire centering ring 16 removably mounted thereon, as by means of bolts 17, 17 passed through holes 17ᵃ, 17ᵃ in plate 15. Centering rings 16 of varying diameters, adapted to accommodate tire casings of different bead diameters may be provided, each ring being constructed and arranged to be secured by the same bolts 17 through the holes 17ᵃ.

Center shaft 14 may be screwed into loading plate 11 and locked firmly in adjusted position by means of nuts 18, 18 on opposite sides of the plate. The top of shaft 14 is provided with a recess 19 for receiving the point of a balancing pin 20, of known construction, secured at the underside of balancing plate 15.

Figure 4:
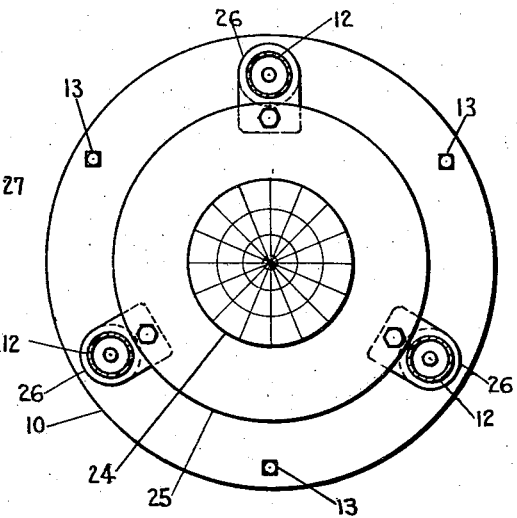
Figure 4 is a cross-section taken on line 4—4 of Figure 2.

Depending in balanced relation from balancing plate 15, through suitable free openings 11ᵇ in plate 11, may be a plurality of rods 21, 21 to the bottom ends of which is secured a plate 22 having centrally thereof a downwardly extending pointer or indicator 23. The indicator 23 preferably is provided with an adjustable weight 23ᵃ thereon to aid in plumbing the apparatus under varying load conditions of plate 15. Cooperating with the end of indicator 23 may be a dial 24, suitably marked to show both the amount and the direction in which a tire is off balance, (see Figures 2 and 4), which dial may be supported by a plate 25 mounted on brackets 26, 26 on the rods 12.

Figure 5:
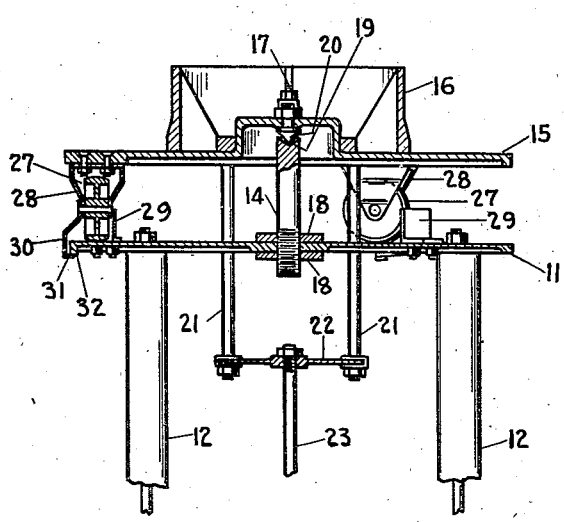
Figure 5 is a fragmentary cross-section taken on line 5—5 of Figure 1.

Since the balancing pin 20 must necessarily be constructed with a very delicate point for extreme accuracy, it might become damaged or broken if subjected to abnormal stresses applied in adjusting a tire casing on the machine for testing, or in removing the tire after a test. To obviate this a plurality of rollers 27, 27, carried by brackets 28, 28 on balancing plate 15, are so arranged that on rotation of plate 15 in a clockwise direction they will ride out of free-hanging position relative to a series of cut-out portions 33, 33 in plate 11, and onto the loading plate 11, whereby slightly to raise or relieve pressure on the point of the balancing pin 20 which normally engages with shaft 14 (see Figures 2 and 5). Lugs 29, 29 may be provided on loading plate 11 to limit rotational movement of plate 15 relative to the cut-out portions 33, in the plate 11. Downwardly extending arms 30, 30 secured to the brackets 28, 28 are provided with inwardly extending flanges 31, 31 for engaging wedge shaped projections 32, 32 on the underside of plate 11. By turning plate 15 in clockwise direction, from the chain-dotted line position to the full line position shown in Figures 1 and 2, the flanges 31 become wedged on the underside of projections 32 against the opposing force of the rollers 27, as the latter roll onto the upper surface of plate 11, this wedging action thereby releasably holding the balancing plate in stable inoperative position with the rollers 27 against the lugs 29, as best shown in Figures 2 and 5. In this last-named position, the rollers 27 firmly support the balancing plate 15 so that pressure between the end of pin 20 and the supporting shaft 14 therefor will be obviated or relieved. The recessed or cut-away portions 33 are provided in plate 11 to allow clearance for the rollers 27 in the tire testing positions thereof, as shown in chain-dotted lines in Figure 3.

In operation of the apparatus for testing a tire, the balancing plate 15 may first be set in the position best shown in chain-dotted lines in Figures 1, 2 and 3, with the rollers 27 over the cut-out portions 33 in plate 11, to permit adjusting the screws 13 with the floor to set the pointer 23 on the exact center of dial 24. When pointer 23 is properly centered plate 15 is then rotated to the full line position shown in Figure 2, for lifting the balancing pin 20 out of load engagement with shaft or socket 14. While the load is thus transferred from shaft 14 to plate 11, through rollers 27, the operator is free to place a finished tire on plate 15, as shown in chain-dotted lines in Figure 2, without fear of damaging the delicate point of pin 20. Once the tire is in place the plate 15 may be rotated counter-clockwise until rollers 27 are over the recesses 33. In the latter position, when the apparatus is in equilibrium, pointer 23 will indicate on the dial 24 the exact amount and direction in which the tire is off balance, if any.

Modifications of the invention may be resorted to without departing from the spirit of the invention or the scope of the appended claims.

What is claimed is:

1. A tire-balancing machine comprising, in combination, a balancing member for receiving thereon a tire to be balanced, means on said member for centering a tire thereon, a pointed balancing-pin located centrally of said member, a relatively fixed support including a portion having its upper end recessed to receive the point of said pin to support said member in normally balanced condition and so as to be rotatable thereon, rollers mounted on said member to depend freely therefrom in a tire-balancing position of said member, said member being rotatable at will to carry said rollers onto portions of said support to relieve the load of the pin on said support and to support said member in stable condition.

2. A tire-balancing machine comprising, in combination, a balancing member for receiving thereon a tire to be balanced, means on said member for centering a tire thereon, a pointed balancing-pin located centrally on the under side of said member, a relatively fixed support spaced below said member, said support having a recess for receiving the point of said pin to support said member in normally balanced condition, rollers mounted on said member to depend freely therefrom in a tire-balancing position, said member being rotatable at will to carry said rollers onto portions of said support to relieve the load of the pin on said support, and means for limiting rotation of said member and to support said member in stable condition.

3. A tire-balancing machine comprising, in combination, a balancing member for receiving thereon a tire to be balanced, means on said member for centering a tire thereon, a pointed balancing-pin located centrally on the underside of said member, a relatively fixed support spaced below said member, said support having a recess for receiving the point of said pin to support said plate in normally balanced condition, rollers mounted on said member to depend freely therefrom in the tire-balancing position thereof, said member being rotatable to carry said rollers onto portions of said support to relieve the load of the pin on said support, and means for releasably holding said member in said relieved position thereof and to support said member in stable condition.

4. A tire-balancing machine comprising, in combination, a balancing member for receiving thereon a tire to be balanced, means on said member for centering a tire thereon, a balancing-pin on the underside of said member centrally thereof, a relatively fixed support spaced below said member, means on said support for receiving said balancing-pin to support said member in balancing condition, an indicator, means depending freely from said member for holding said indicator coaxial with said pin, a dial on said support associated with said indicator to indicate the amount and direction of off-balance of a tire tested on said machine, and rollers mounted on said member to depend freely in tire-balancing position thereof, said member being rotatable at will on said pin to carry said rollers onto portions of said support to relieve the load of the pin on said support and to support said member in stable condition.

5. A tire-balancing machine comprising, in combination, a balancing member for receiving thereon a tire to be balanced, means on said member for centering a tire thereon, a balancing-pin on the underside of said member centrally thereof, a relatively fixed support for said member, means on said support for receiving said balancing-pin to support said member in balancing condition, an indicator, means depending freely from said member for holding said indicator coaxial with said pin, a dial on said support associated with said indicator to indicate the amount and direction of off-balance of a tire being tested on said machine, rollers mounted on said member to depend freely relative to said support in tire-balancing position of said member, said member being rotatable at will on said pin to carry said rollers onto portions of said suport to relieve the load of the pin on said support, and means associated with said member and said support for releasably holding said member in the relieved position and to support said member in stable condition.

6. A balancing machine comprising, in combination, a balancing member for receiving thereon an article to be balanced, means on said balancing member for centering an article thereon, a relatively fixed supporting member in spaced relation beneath said balancing member, balancing means mounted between said members centrally thereof and including a pointed pin on one of the members and a socket on the other member for receiving the point of said pin rotatably to support the balancing member in normally balanced condition, circumferentially spaced elements mounted on said balancing member to depend freely in an article-balancing position thereof, said supporting member having portions thereon engageable by said elements when said balancing member is rotated on said balancing means from said balanced position of the balancing member, whereby said balancing member is lifted to relieve the load thereof on said pin and to support the balancing member in stable condition.

ANSELM DE GHETTO.